US008321212B2

(12) United States Patent
Kim

(10) Patent No.: US 8,321,212 B2
(45) Date of Patent: Nov. 27, 2012

(54) TERMINAL AND METHOD FOR SUPPORTING MULTI-LANGUAGE

(75) Inventor: Mi-Sun Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 1005 days.

(21) Appl. No.: 12/045,123

(22) Filed: Mar. 10, 2008

(65) Prior Publication Data

US 2008/0319734 A1 Dec. 25, 2008

(30) Foreign Application Priority Data

Jun. 19, 2007 (KR) .................. 10-2007-0060045

(51) Int. Cl.
*G06F 17/20* (2006.01)
(52) U.S. Cl. ........................................ 704/208
(58) Field of Classification Search .................. 704/208
See application file for complete search history.

(56) References Cited

U.S. PATENT DOCUMENTS

| | | | | |
|---|---|---|---|---|
| 6,128,381 A * | 10/2000 | Holmstrom et al. | ..... | 379/356.01 |
| 6,344,880 B1 * | 2/2002 | Takahashi et al. | ............ | 348/563 |
| 7,051,360 B1 * | 5/2006 | Ellis et al. | ...................... | 725/136 |
| 7,860,516 B2 * | 12/2010 | Hodges et al. | ............. | 455/456.1 |
| 7,991,435 B2 * | 8/2011 | Bok et al. | ........................ | 455/566 |
| 2001/0029455 A1 * | 10/2001 | Chin et al. | ................... | 704/277 |
| 2002/0064316 A1 * | 5/2002 | Takaoka | ......................... | 382/305 |
| 2002/0123879 A1 * | 9/2002 | Spector | ............................. | 704/2 |
| 2002/0169619 A1 * | 11/2002 | Ishihara | ......................... | 704/275 |
| 2003/0108164 A1 * | 6/2003 | Laurin et al. | ................ | 379/88.01 |
| 2003/0208352 A1 * | 11/2003 | Lee | .................................... | 704/2 |
| 2004/0210321 A1 * | 10/2004 | Hayashi et al. | .................. | 700/11 |
| 2004/0250293 A1 * | 12/2004 | Ryal et al. | ...................... | 725/135 |
| 2005/0149335 A1 * | 7/2005 | Mesbah et al. | ................. | 704/277 |
| 2005/0245190 A1 | 11/2005 | Meyer et al. | | |
| 2006/0126560 A1 * | 6/2006 | Wotherspoon et al. | ........ | 370/329 |
| 2006/0135080 A1 * | 6/2006 | Khandekar et al. | ............. | 455/69 |
| 2006/0195752 A1 * | 8/2006 | Walker et al. | .................. | 714/748 |
| 2006/0253874 A1 * | 11/2006 | Stark et al. | ...................... | 725/62 |
| 2007/0036102 A1 * | 2/2007 | Hwang et al. | .................. | 370/328 |
| 2007/0054637 A1 * | 3/2007 | Cho | ........................... | 455/185.1 |
| 2007/0239856 A1 * | 10/2007 | Abadir | .......................... | 709/219 |
| 2007/0240190 A1 * | 10/2007 | Arseneau et al. | ................ | 725/81 |
| 2009/0320073 A1 * | 12/2009 | Reisman | .......................... | 725/51 |
| 2011/0072461 A1 * | 3/2011 | Moon et al. | ..................... | 725/40 |

FOREIGN PATENT DOCUMENTS

| | | |
|---|---|---|
| DE | 19844809 C1 | 6/2000 |
| EP | 0923195 A1 | 6/1999 |
| EP | 1780917 A1 | 5/2007 |

* cited by examiner

*Primary Examiner* — Jakieda Jackson
(74) *Attorney, Agent, or Firm* — Birch, Stewart, Kolasch & Birch, LLP

(57) ABSTRACT

A device, computer program product and method for supporting multi-language of a mobile terminal comprising: receiving broadcast data; checking whether a selected broadcast channel supports multi-language based on additional information of the received broadcast data; and outputting an indication message when the broadcast channel supports the multi-language, whereby a user can flexibly set a broadcast language of his desired channel during or before broadcasting outputted, and also a use interface environment can be improved so as to facilitate the setup or change of the broadcast language.

19 Claims, 11 Drawing Sheets

TERMINAL AND METHOD FOR SUPPORTING MULTI-LANGUAGE

CROSS REFERENCE TO RELATED APPLICATIONS

This application is related to and claims priority under 35 U.S.C. §119(a) to Patent Application No. 10-2007-0060045 filed in Republic of Korea on Jun. 19, 2007, the entire contents of which are hereby incorporated by reference.

BACKGROUND OF THE INVENTION

1. Field of the Invention

The present invention relates to a mobile terminal providing a digital multimedia broadcast, and particularly, a terminal, computer program product and method for supporting multi-language.

2. Description of the Background Art

Analog broadcasting was originally developed for reception by fixed devices. Accordingly, when a user receives the audio broadcasting while walking or driving a vehicle, the sound quality of the audio broadcasting is significantly lowered, and higher output and a wider frequency band are required.

In order to solve these problems, efforts have been made around the world to standardize digital audio broadcasting and make it more suitable for mobile reception. Examples include DAB (Digital Audio Broadcasting) in Europe, where Eureka-147 has been adopted as DAB standard, DAR (Digital Audio Radio) in the United States, DRB (Digital Radio Broadcasting) in Canada, DSB (Digital Sound Broadcasting) in ITU-R (International Telecommunication Union), and DMB (Digital Multimedia Broadcasting) in Korea.

These digital audio broadcasting techniques are sufficiently robust to be compatible with electromagnetic wave environments and with noise in downtown areas. Therefore, even if transmissions are executed with low outputs, electric waves carrying sound with CD level quality can be received in a vehicle that is moving at high speed. Further, the concept of audio broadcasting is broadened from the existing 'audible' broadcasting to 'visible and audible' broadcasting. As such, according to the audio broadcasting service, in addition to music broadcasting, a variety of multimedia information, such as news, traffic information, weather information, geographic and location information, video information and the like, can be transmitted through characters and graphics.

DMB in Korea has CD level sound quality which surpasses the level of existing AM and FM radio, and provides various data services, such as characters, graphics and moving pictures at a data transmission speed of 1.5 Mbit/sec. Also, DMB further provides bidirectional services along with superior quality broadcasting reception while a receiver is on the move.

In general, a digital multimedia broadcast channel may comprise a video stream and an audio stream. Several audio streams may exist in one video stream in order to allow audio streams in various languages to be supported. FIG. 1 illustrates a stream construction of a background digital multimedia broadcast channel.

Information related to various audio streams may be placed in one channel known as an ESG (Electronic Services Guide) service (Service→ServiceLanguage) with or without detailed information on contents (Content→Language).

In the related art, a mobile terminal may set a default language set in a menu as its broadcast language.

As illustrated in FIG. 1, although French audio is set as the default language, events 1, 2, 4 and 5, only support English. Thus, the events are reproduced by English audio.

However, as event 3 supports multi-language, namely, both English audio and French audio, event 3 may be reproduced by the French audio as the default language.

SUMMARY OF THE INVENTION

Therefore, an object of the present invention is to provide a method for supporting multi-language operations capable of flexibly setting and changing a broadcast language of a desired channel and a mobile terminal thereof.

In one aspect of the present invention, there is provided a mobile terminal for selecting and setting a broadcast service language before a broadcasting an output.

To achieve the one aspect of the present invention, a mobile terminal for supporting multi-language may comprise: a receiver adapted to receive broadcast data; a controller adapted to check whether each broadcast channel supports multi-language, based on additional information of the broadcast data; and an output unit adapted to display the checked result as to whether each broadcast channel supports multi-language, and display a language list of a channel selected by a user.

In one aspect of the present invention, there is provided a method for supporting multi-language of a mobile terminal comprising: checking whether each broadcast channel supports multi-language based on additional information of broadcast data after receiving the broadcast data; and displaying a language list of the channel supporting the multi-language and setting and changing a broadcast language according to a user selection.

In another aspect of the present invention, there is provided a mobile terminal capable of selecting and changing a broadcast service language during broadcasting outputted.

To achieve the another aspect of the present invention, a mobile terminal for supporting multi-language may comprise: an output unit adapted to display broadcast contents of a specific channel; and a controller adapted to control the output unit to display a language list of the channel on a portion of a screen if a user inputs a particular key. Here, the controller may change a broadcast language of the channel according to a user selection.

In another aspect of the present invention, a method for supporting multi-language of a mobile terminal may comprise: displaying broadcast contents of a specific channel; displaying a language list of the channel on a portion of a screen if a user inputs a particular key; and changing a broadcast language of the channel according to a user selection.

The step of displaying the language list may comprise displaying a corresponding menu and the language list when the user inputs a particular key for setting a broadcast environment; and receiving the user selection to set a broadcast language.

In still another aspect of the present invention, there is provided a mobile terminal which can automatically output an indication message and determine whether to change a broadcast language when the mobile terminal moves to a specific region.

To achieve the still another aspect of the present invention, a mobile terminal for supporting multi-language may comprise: a receiver adapted to receive broadcast data; a controller adapted to add a language supported in a certain region to a language list, based on additional information of the broadcast data, when the mobile terminal moves to the certain region; and an output unit adapted to output an indication message with respect to the addition of the language under the control of the controller.

When a user selects the language supported in the certain region according to the indication message, the controller may change a broadcast language of the channel into the selected language.

In still another aspect of the present invention, a method for supporting multi-language of a mobile terminal may comprise: receiving broadcast data; adding a language supported in a certain region to a language list, based on additional information of the broadcast data, when the mobile terminal moves to the certain region; and outputting an indication message with respect to the addition of the language and changing a broadcast language according to a user selection.

The step of adding the language to the language list may comprise: updating the additional information when the mobile terminal moves to the certain region; checking whether the certain region supports any other language, based on the updated additional information; and if a language is supported in the certain region, adding the corresponding language to the language list.

The foregoing and other objects, features, aspects and advantages of the present invention will in part become more apparent from the following detailed description of the present invention or be learned by the practice of the present invention when taken in conjunction with the accompanying drawings and structures disclosed in the appended claims.

DETAILED DESCRIPTION OF THE INVENTION

Description will now be given in detail of the present invention, with reference to the accompanying drawings.

Figure 1:
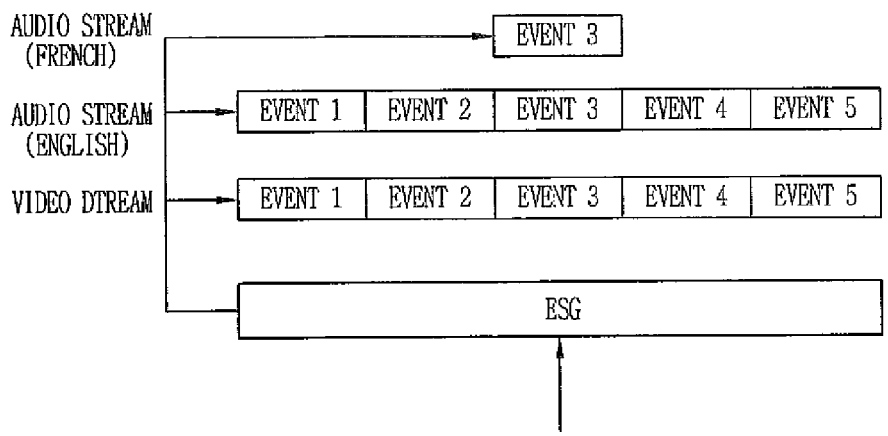
FIG. 1 is a view illustrating a stream configuration of a background digital multimedia broadcast channel.
Figure 2:
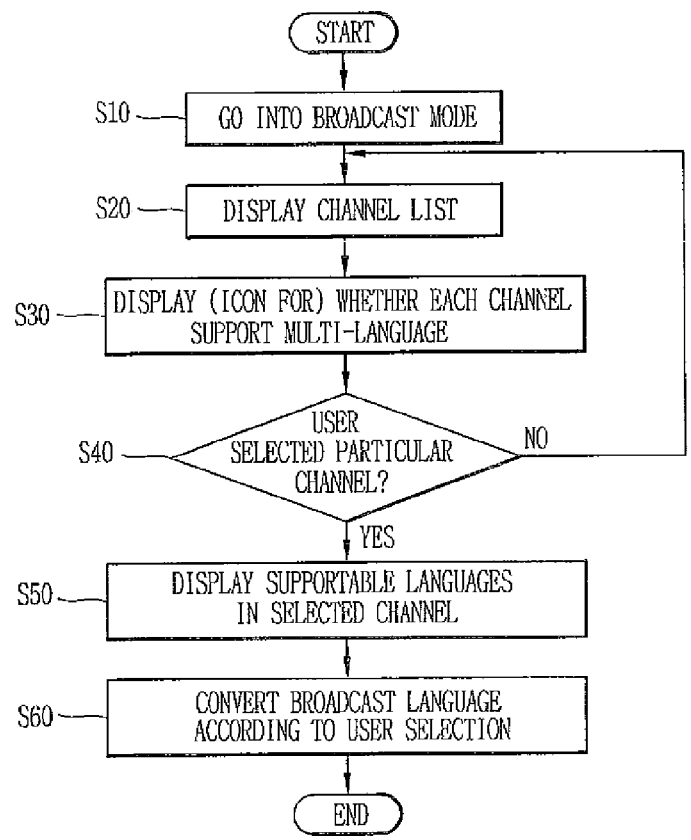
FIG. 2 is a flowchart illustrating a method for setting a broadcast language in accordance with a first embodiment of the present invention.

FIG. 2 is a flowchart illustrating a method for setting a broadcast language in accordance with a first embodiment of the present invention.

When a mobile terminal goes into a broadcast mode according to a user's command, the mobile terminal receives broadcast streams via an antenna. The received broadcast streams are transferred to a decoder (not shown) via a broadcast receiving module. While passing through the decoder, audio stream and video stream of the broadcast streams are decoded into an audio signal and a video signal. The decoded audio signal and video signal are provided to the user as one complete broadcast content via a speaker and a display.

In one embodiment of the present invention, a controller 180 (See FIG. 10) refers to additional information (e.g., ESG (Electronic Services Guide)) included in broadcast data so as to check whether a specific broadcast channel (e.g., a video channel) supports multi-language operations. If it is checked based on the additional information (e.g., ESG) that the specific broadcast channel (e.g., the video channel) has a plurality of language channels (e.g., audio channels), the controller 180 determines that the corresponding broadcast channel supports multi-language operations. Then, the controller 180 generates a language list and stores it in a memory 160.

Broadcast Language Setup and Language List Display Before Broadcast Output

The broadcast mode denotes a state of the mobile terminal capable of providing a broadcast service. As illustrated in FIG. 2, when the mobile terminal goes into the broadcast mode (S10), an ESG TV guide (referred to as a channel list hereafter) including information related to broadcast channels, such as CNN, BBC, mspn, and the like, is displayed on a display of the mobile terminal (S20).

Figure 3:
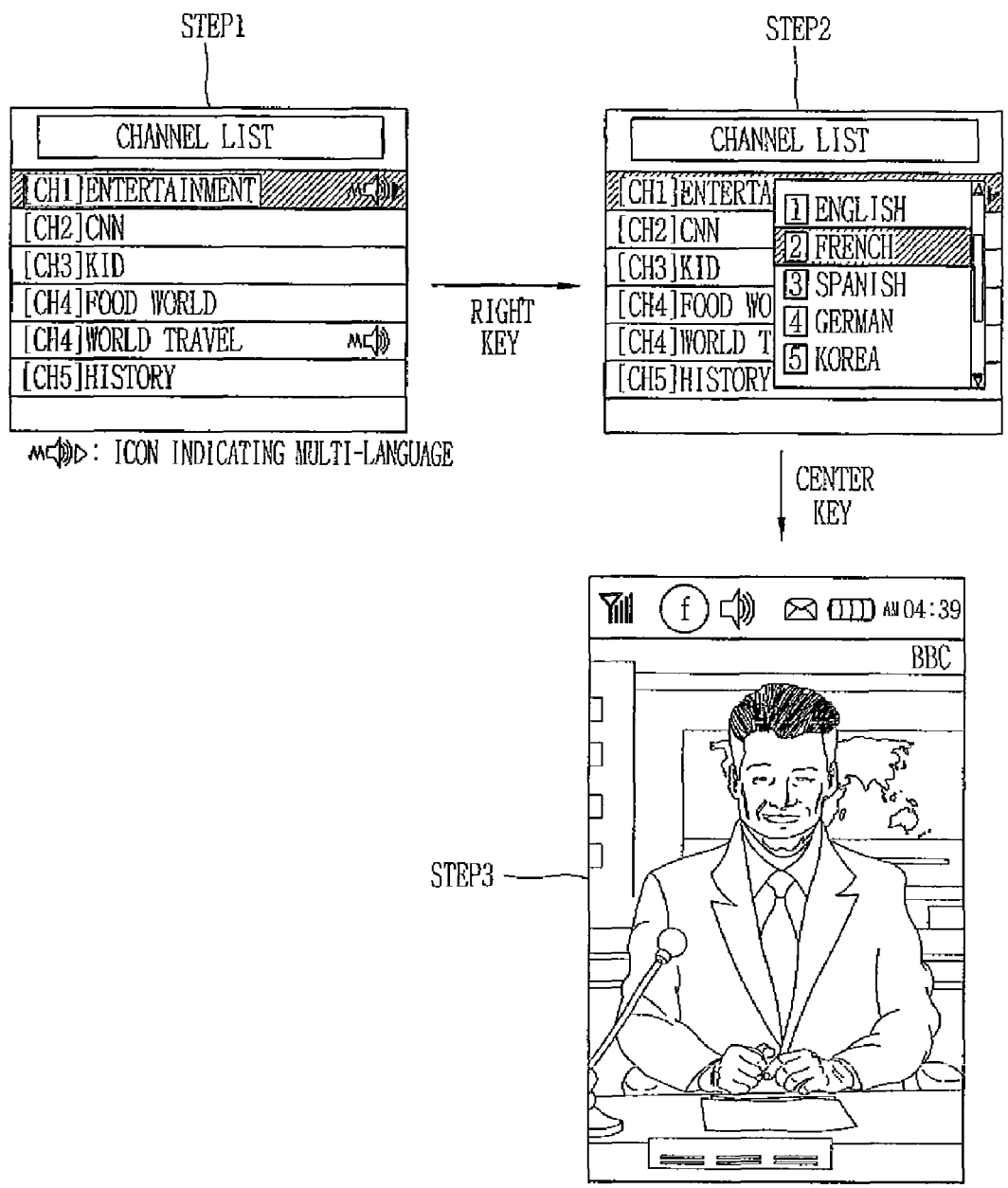
FIG. 3 is a view illustrating a process of setting a broadcast language in accordance with the first embodiment of the present invention.

FIG. 3 illustrates a method for setting a broadcast language in accordance with a first embodiment of the present invention. FIG. 3 shows a screen for displaying a broadcast language before outputting broadcasting for setup.

As illustrated in step A of FIG. 3, if a specific broadcast channel supports multi-language, the controller 180 displays an icon m̂ indicating the presence of multi-language together with the corresponding channel (S30). When a user selects a broadcast channel supporting multi-language operations (S40), the controller 180 displays a language(s) which can be supported by the corresponding broadcast channel on a screen (S50), as illustrated in step B of FIG. 3.

When two or more languages can be supported in the corresponding broadcast channel and the user selects one of the two languages, the controller 180 sets the selected language as a broadcast language of the corresponding channel (S60).

As illustrated in step A of FIG. 3, a channel list may also be displayed when the mobile terminal goes into the broadcast mode, the channel list displayed for each language, or displayed for each channel providing the same contents.

Figure 4:
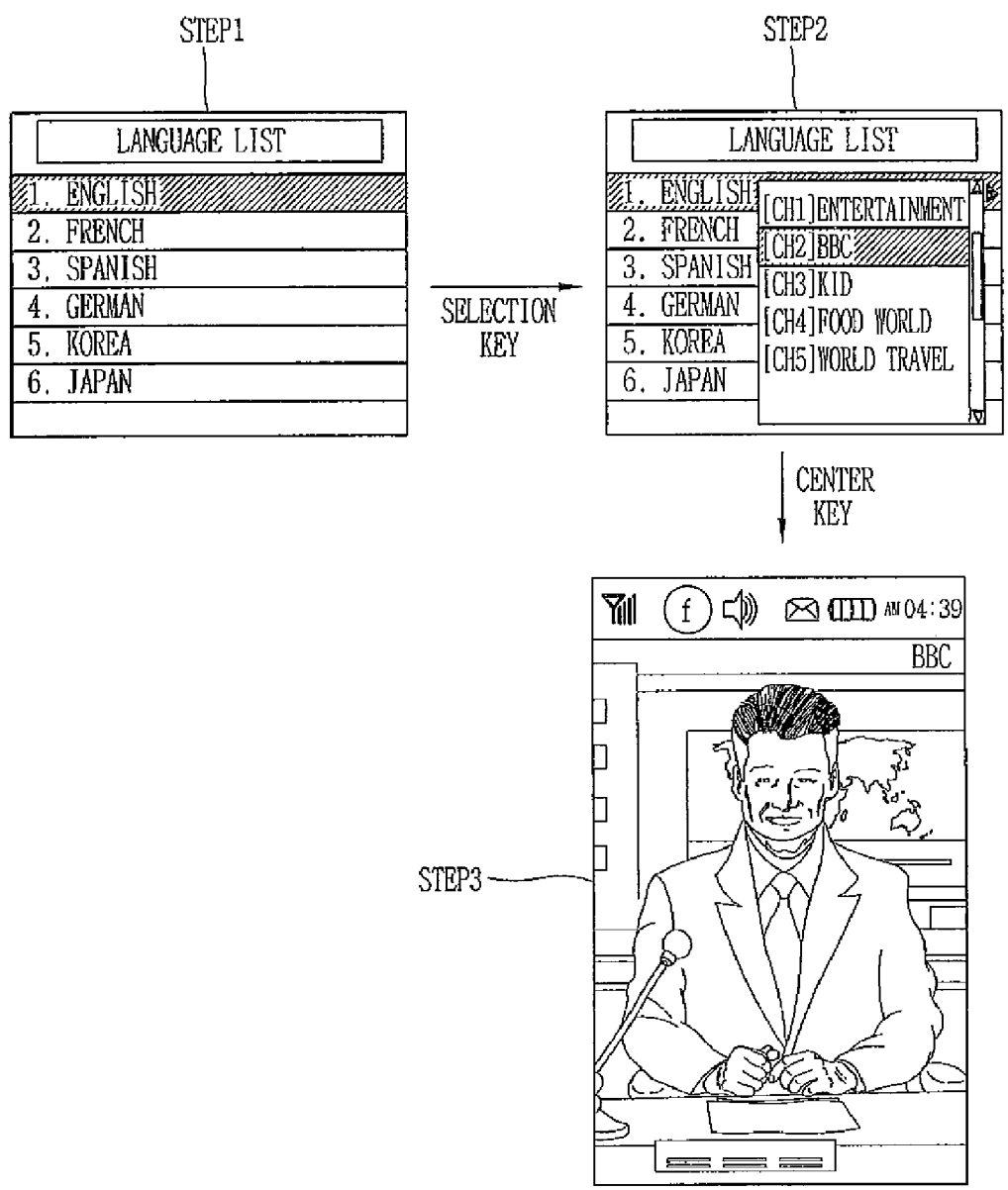
FIG. 4 is a view of a screen for displaying a channel list by each language when a mobile terminal is in a broadcast reception mode.

FIG. 4 illustrates a screen of displaying a channel list for each language when the mobile terminal is in the broadcast mode.

As illustrated in step A of FIG. 4, when the mobile terminal enters the broadcast mode, a language list is displayed on a screen, and a user selects one (e.g., French) of the languages. The controller 180 of the mobile terminal, as illustrated in step B of FIG. 4, displays a channel list supporting French and waits for a user's selection. Thereafter, when the user selects his desired channel, the controller 180 outputs the broadcasting of the selected channel in French.

Figure 5:
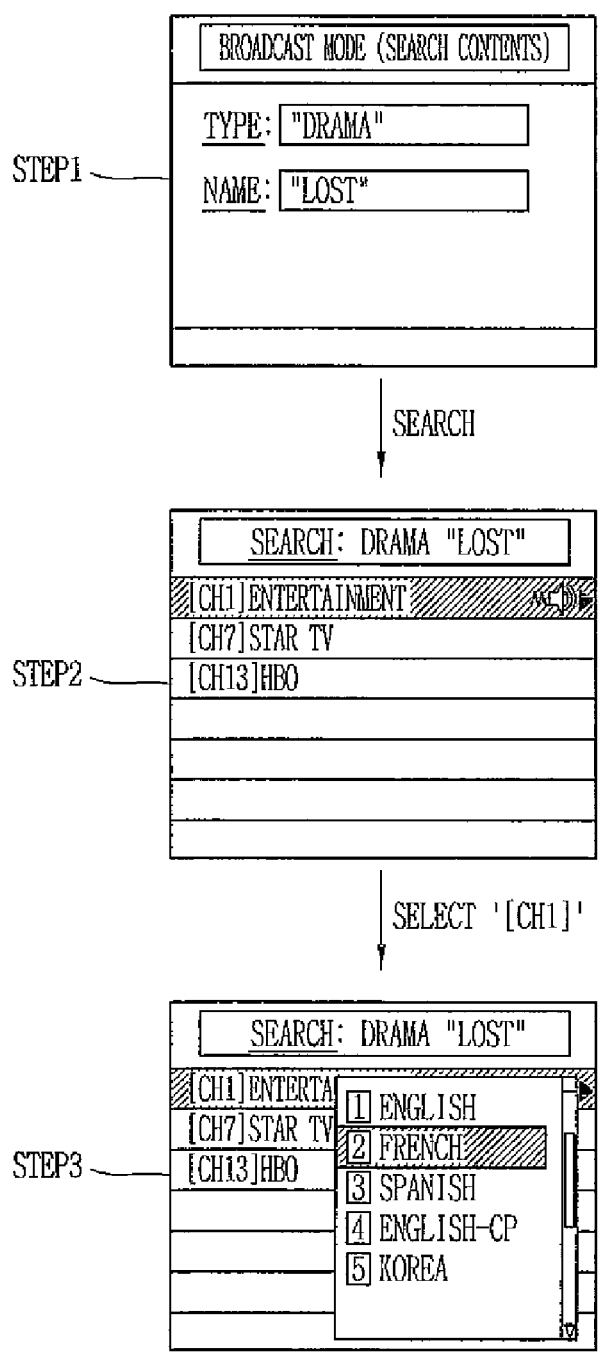
FIG. 5 is a view of a screen for searching channels providing the same contents and displaying a language list when a mobile terminal is in a broadcast reception mode.

FIG. 5 illustrates a screen of searching channels providing the same contents and displaying a language list when the mobile terminal is in the broadcast mode.

When the mobile terminal enters the broadcast mode, the user first inputs a name or title (e.g., a drama "LOST") of contents (or a program) desired to be watched, thus to search channels providing the contents. Upon searching the corresponding channels, the controller 180 displays the searched channels as illustrated in step B of FIG. 5.

Among the searched channels, a channel supporting multi-language is displayed together with a multi-language icon. When the user selects a channel indicated by the multi-language icon m̂, the controller 180, as illustrated in step C of FIG. 5, displays a language(s) which can be supported by the corresponding broadcast channel on a screen.

When two or more languages can be supported in the corresponding broadcast channel and the user selects one of the two languages, the controller 180 sets the selected language as a broadcast language of the corresponding channel.

In the first embodiment of the present invention, if one language is supported by the broadcast, the mobile terminal can display a certain icon indicating the language instead of the multi-language icon m̂. For example, ê indicates English, f̂ indicates French, ŝ indicates Spanish, ĉ indicates Chinese, k̂ indicates Korean, and the like.

In addition, if a language is a subtitle (e.g., an English subtitle) other than voice, the present invention can display it in a language list, or can display it in a language list by being classified into a subtitle (e.g., English—cp) and voice (e.g., English) as shown in step C of FIG. 5.

Broadcast Language Setup and Language List Display During Broadcast Output

Once broadcasting begins, the mobile terminal can display or change a language in various manners during the broadcasting outputted.

Figure 6:
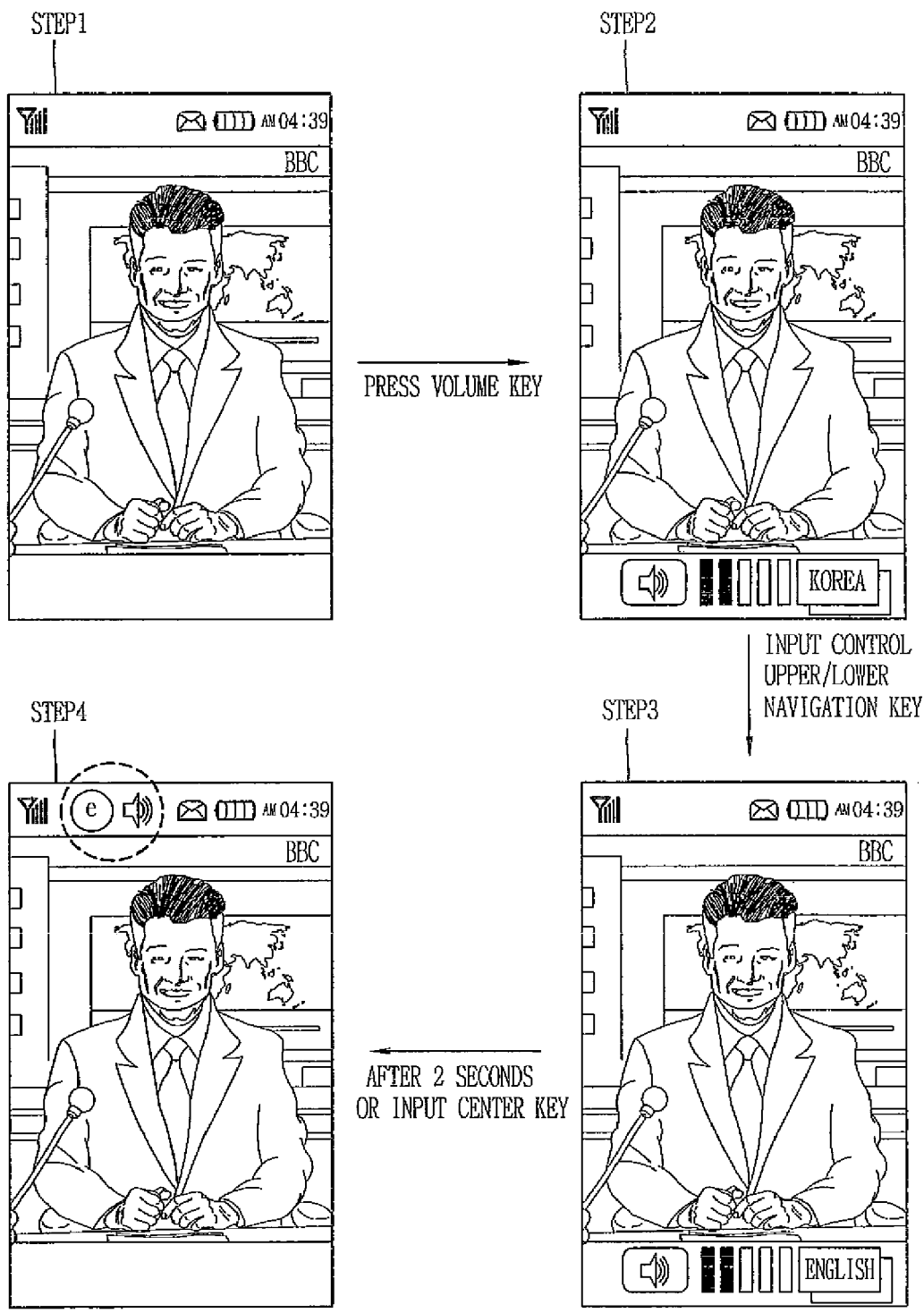
FIG. 6 is a view illustrating a process of setting a broadcast language in accordance with a second embodiment of the present invention.

FIG. 6 illustrates a method for setting a broadcast language in accordance with a second embodiment of the present invention. FIG. 6 shows a process of converting a setup of a broadcast language during the broadcast output.

The mobile terminal in the second embodiment displays a list of languages which can be set (e.g., at a side of a screen) when a user enters (inputs) a specific functional key (e.g., a volume key) (e.g., provided at an outer surface of the mobile terminal.)

As illustrated in FIG. 6, a user manipulates a volume key (e.g., disposed at the mobile terminal.) The controller 180, having sensed the enter of the volume key, then displays a volume level control bar on a screen and waits for a user input. Here, the user may adjust the volume of sound (e.g., in the same manner as manipulating right and left navigation keys), while he may display the list of languages on a screen (e.g., by manipulating upper and lower navigation keys). The language list displayed on the screen may be displayed as several sheets of overlaid cards as illustrated in step C of FIG. 6, or displayed using a pop-up window as illustrated in step C of FIG. 5, for example. Other display types are possible. If the language list is displayed as illustrated in step C of FIG. 6, when the user manipulates the upper and lower navigation keys, a curser of the language list can be scrolled as if cards are turned over.

Figure 7:
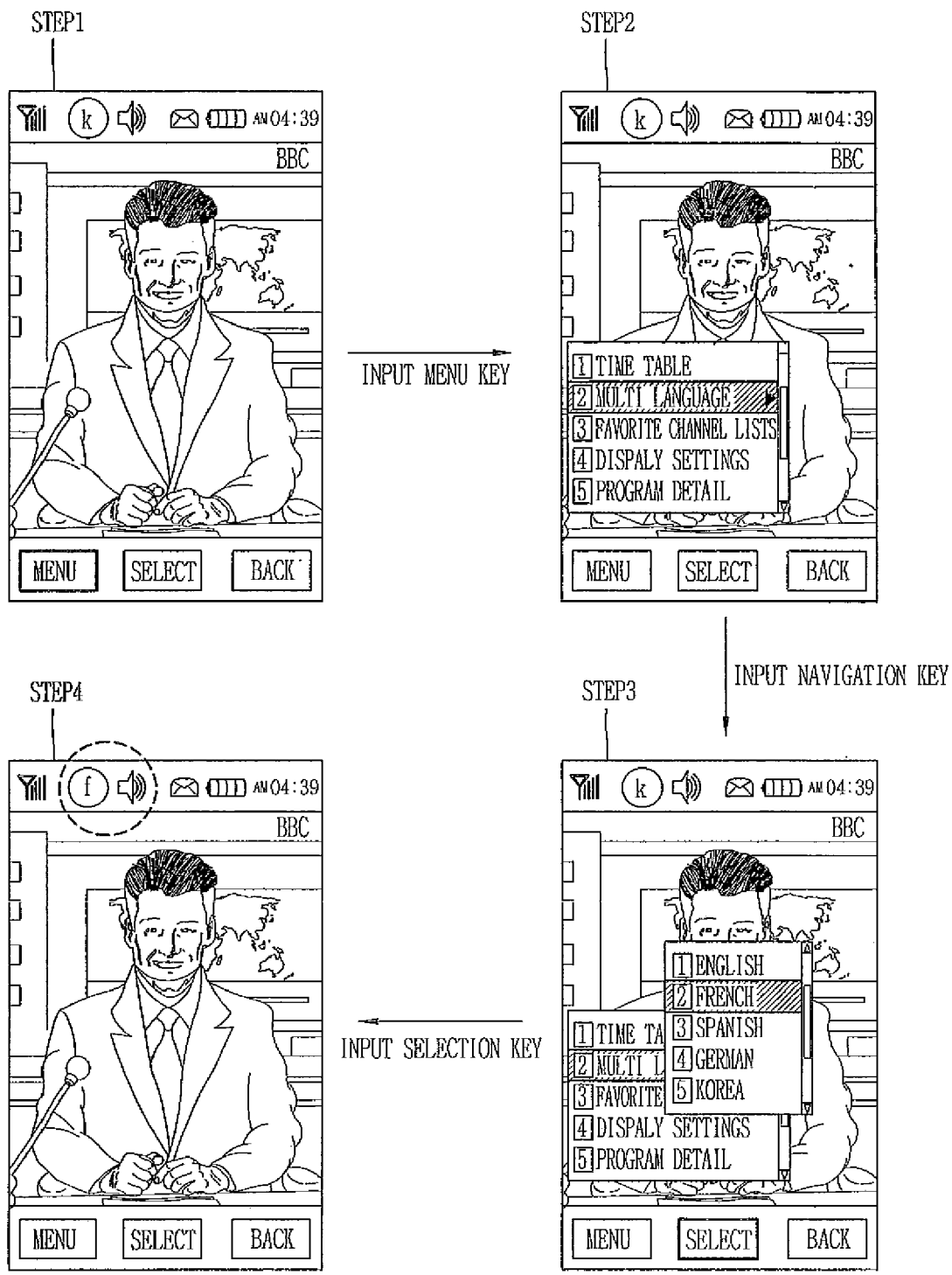
FIG. 7 is a view illustrating a process of a process of setting a broadcast language in accordance with a third embodiment of the present invention.

FIG. 7 illustrates a method for setting a multi-language mode in accordance with a third embodiment of the present invention. FIG. 7 shows a process of converting a setup of a broadcast language during broadcast output.

The mobile terminal in the third embodiment can convert (or set) a broadcast language by using a separate broadcast environment setup menu.

As Illustrated in FIG. 7, when a user desiring to convert a broadcast language manipulates (inputs, presses) a soft or hard key to execute a broadcast option menu, the controller 180, having sensed the input, displays a broadcast option menu pop-up window on a screen and waits for a user's selection. When the user selects a multi-language item on the menu pop-up window, the controller 180 displays the languages on the screen as illustrated in step C of FIG. 7, and then waits for the user's selection again. Thereafter, when the user selects a specific language (e.g., French), the controller 180 changes the broadcast language into the selected language (e.g., French).

The menu pop-up window may be executed by a soft key, or be executed by manipulating a functional key disposed at an outer surface of the mobile terminal.

Figure 8:
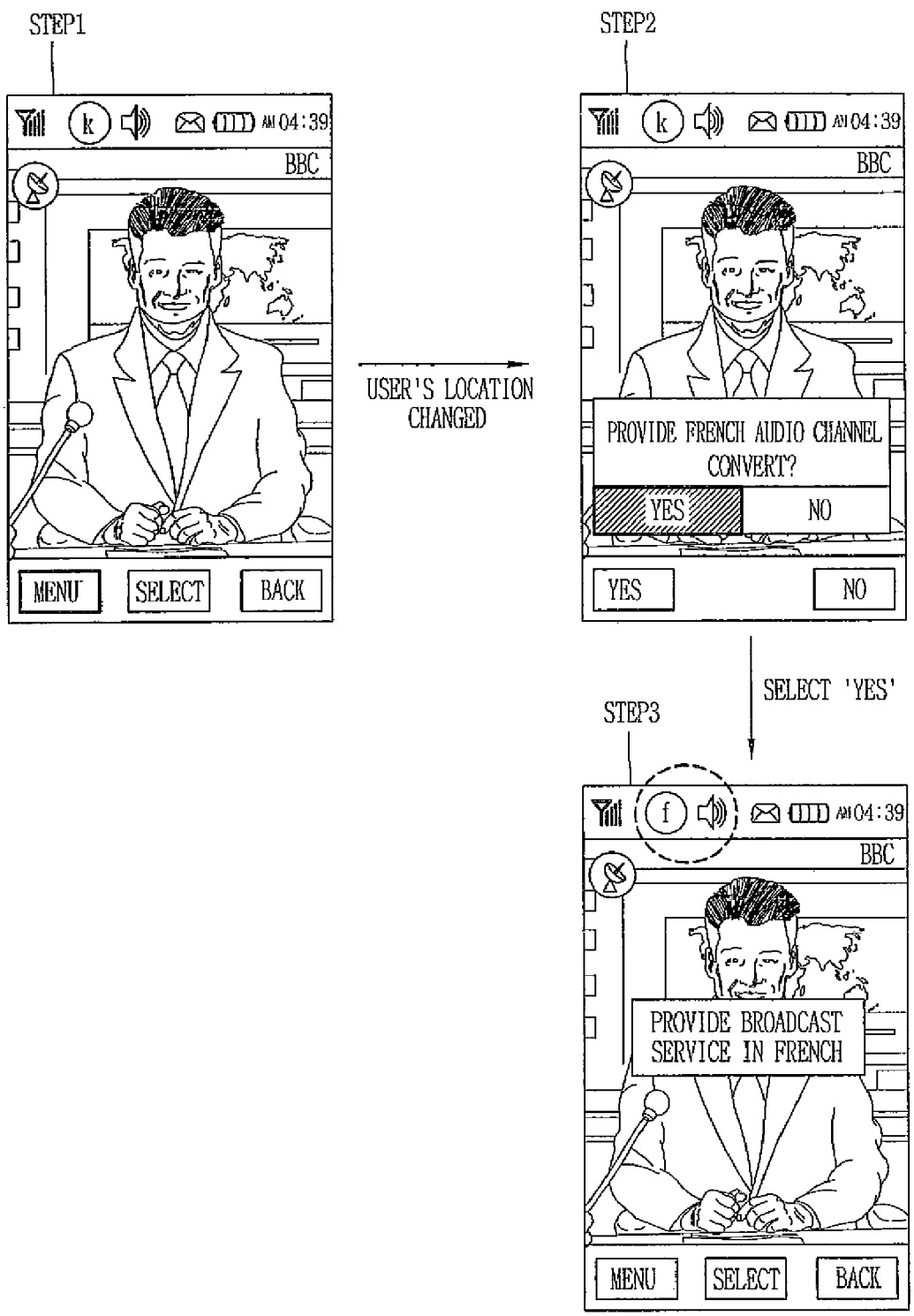
FIG. 8 is a view illustrating a process of setting a broadcast language in accordance with a fourth embodiment of the present invention.

FIG. 8 illustrates a method for setting a multi-language option in accordance with a fourth embodiment of the present invention. FIG. 8 shows a process of converting a setup of a broadcast language during broadcasting outputted.

The mobile terminal in the fourth embodiment may convert (or set) a broadcast language using location information thereof.

When the mobile terminal moves to a specific region using another language (e.g., a boundary region, a region using a foreign language, etc.), location information related to the mobile terminal which is received from a Global Positioning System (GPS) module is changed. The controller 180 having sensed the change then updates the ESG Under a general condition, the ESG updating is periodically performed with a preset time interval. However, in one option, when the mobile terminal moves to a specific region, the ESG updating is forcibly performed by a command of the controller 180.

Upon completing the ESG updating, the controller 180 adds a broadcast language supported in the specific region to a language list of the mobile terminal according to the updated ESG information. The controller 180 then displays an indication message with respect to the addition of the language, as illustrated in step B of FIG. 8.

The controller 180 may maintain the existing broadcast language or convert it into the language supported in the specific region according to the user's selection. When the user attempts to convert the existing broadcast language into the language supported in the specific region, if the language of the corresponding region is not supported by his mobile terminal or the conversion into the language of the corresponding region is impossible, the controller 180 displays a corresponding reason on a screen.

In the fourth embodiment, when the user manipulates a soft key to execute the broadcast option menu in order to convert a broadcast language, as illustrated in FIG. 7, the processes described in the third embodiment may equally be executed.

Figure 9:
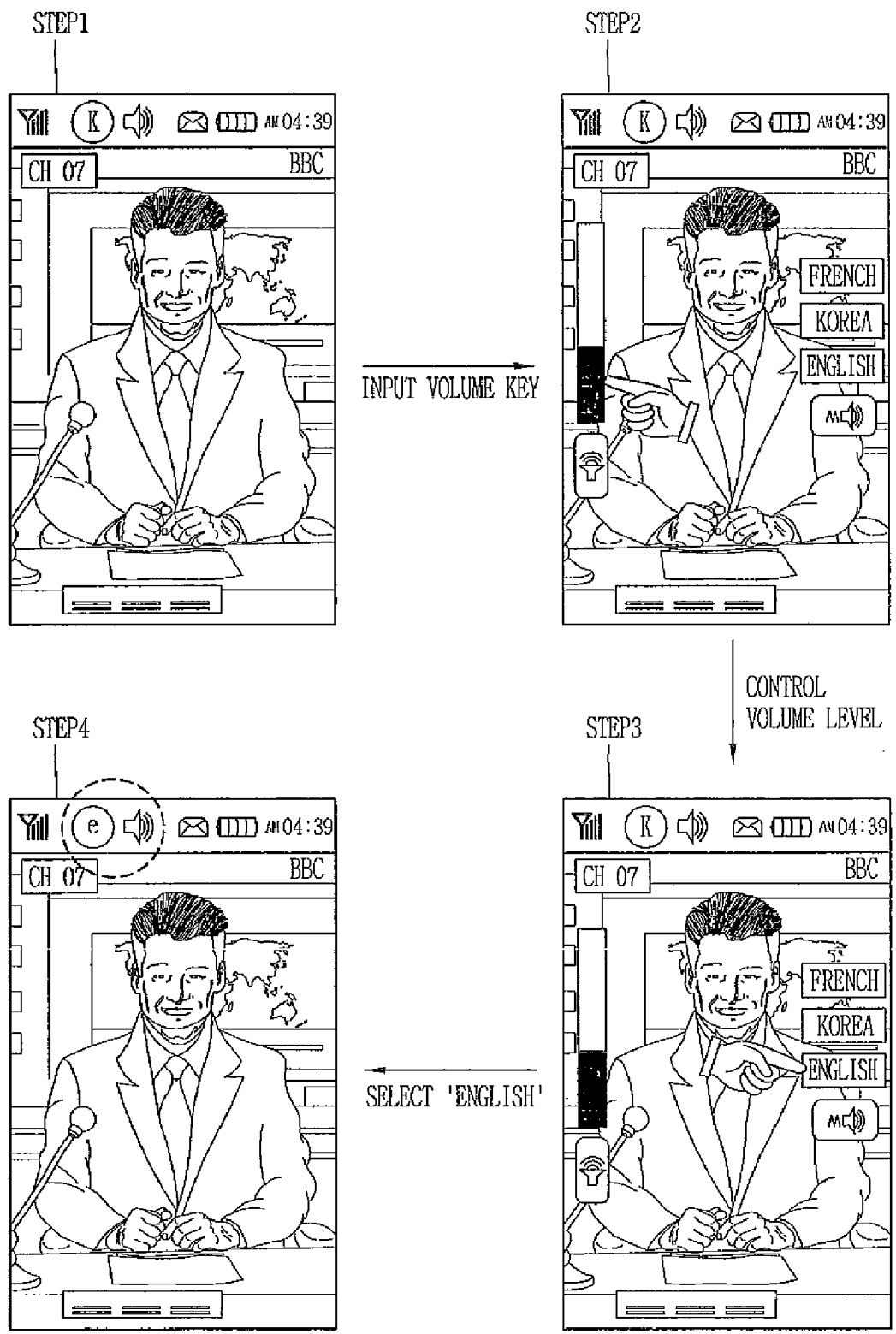
FIG. 9 is a view illustrating a process of setting a broadcast language in accordance with a fifth embodiment of the present invention.

FIG. 9 illustrates a method for setting multi-language in accordance with a fifth embodiment of the present invention. FIG. 9 shows a process of converting a setup of a broadcast language during broadcasting outputted.

The mobile terminal in the fifth embodiment has a touch screen to perform a conversion (or setup) of a broadcast language.

When a user enters a specific functional key (e.g., a volume key) disposed at an outer surface of the mobile terminal or touches the screens the controller 180 displays a language list at a portion of the screen.

Step B of FIG. 9 illustrates a screen on which a volume level control bar and a language list are displayed when the user enters a volume key. The volume level and the broadcast language of the mobile terminal are selected (or controlled) when the user touches the screen. The controller 180 applies the selected volume level and the broadcast language to the mobile terminal.

Figure 10:
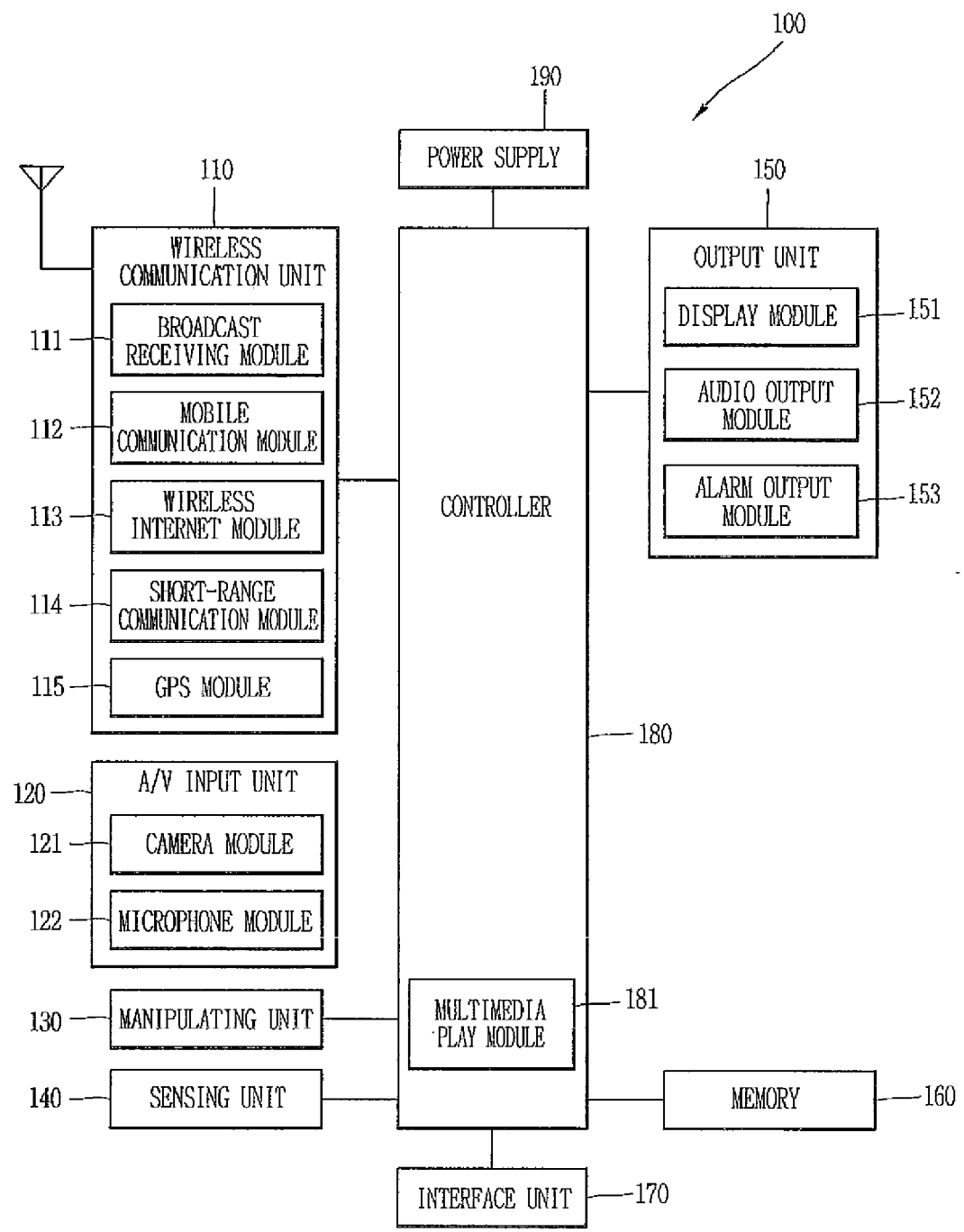
FIG. 10 is a block diagram of a mobile terminal in accordance with an embodiment of the present invention.

FIG. 10 is a block diagram illustrating a mobile terminal in accordance with an embodiment of the present invention. A mobile terminal of the present invention will be described with reference to FIG. 10 from the perspective of its functions.

The mobile terminal 100 may comprise components, such as a wireless communication unit 110, an Audio/Video (A/V) input unit 120, a manipulating unit 130, a sensing unit 140, an output unit 150, a memory 160, an interface unit 170, a controller 180, a power supply 190, and the like. When those components are implemented in the mobile terminal, if required, two or more components may be combined into one or one component may be divided into two or more components.

Hereinafter, each component is described in sequence.

The wireless communication unit 110 may comprise at least one of a broadcast receiving module 111, a mobile communication module 112, a wireless internet module 113, a short-range communication module 114 and a Global Positioning System (GPS) module 115.

The broadcast receiving module 111 receives a broadcast signal and/or broadcast associated information from an external broadcast managing entity via a broadcast channel (or a broadcast additional information channel). The broadcast channel may include a satellite channel and a terrestrial channel. The broadcast managing entity may indicate a server which generates and transmits a broadcast signal and/or broadcast associated information or a server which receives a pre-generated broadcast signal and/or broadcast associated information and sends them to the mobile terminal. Examples of broadcast associated information may include information associated with a broadcast channel (e.g., a channel list, etc.), a broadcast program (e.g., a time table, broadcast time and contents of a program, information on players, etc.), a broadcast service provider, etc. The broadcast signal may be implemented as a TV broadcast signal, a radio broadcast signal, and a data broadcast signal, among others. If desired, the broadcast signal may further include a broadcast signal combined with a TV or radio broadcast signal.

The broadcast associated information may be provided via a mobile communication network, and received by the mobile communication module 112.

The broadcast associated information may be implemented in various formats. For instance, broadcast associated information may include Electronic Program Guide (EPG) of Digital Multimedia Broadcasting (DMB), Electronic Service Guide (ESG) of Digital Video Broadcast-Handheld (DVB-H), and the like.

The broadcast receiving module 111 may be configured to receive digital broadcast signals transmitted from various types of broadcast systems. By no limiting example, such broadcast systems may include Digital Multimedia Broadcasting-terrestrial (DMB-T), Digital Multimedia Broadcasting-satellite (DMB-S), Media Forward Link Only (Media-FLO), Digital Video Broadcast-handheld (DVB-H), Integrated Services Digital Broadcast-Terrestrial (ISDB-T), and the like. The broadcast receiving module 111 may be configured to be suitable for every broadcast system transmitting broadcast signals as well as the digital broadcasting systems. Broadcast signals and/or broadcast associated information received via the broadcast receiving module 111 may be stored 111 a suitable device, such as a memory 160.

The mobile communication module 112 transmits/receives wireless signals to/from one or more network entities (e.g., base station, Node-B, an external mobile terminal, etc.) on a mobile communication network. Here, the wireless signals may include audio, video, video call signal, or various formats of data according to transmission/reception of text/multimedia messages.

The wireless internet module 113 supports Internet access for the mobile terminal. This module may be internally or externally coupled to the mobile terminal.

The short-range communication module 114 facilitates relatively short-range communications. Suitable technologies for implementing this module may include Bluetooth, Radio Frequency IDentification (RFID), Infrared Data Association (IrDA), Ultra-WideBand (UWB), ZigBee, and the like.

The Global Positioning System (GPS) module 115 may receive in cooperation with associated satellites.

The A/V input unit 120 is configured to provide audio or video signal input to the mobile terminal. The A/V input unit 120 may include a camera module 121 and a microphone module 122. The camera module 121 receives and processes image frames of still pictures or video obtained by image sensors in a video call mode or a capturing mode. The processed image frames may be displayed on a display 151.

The image frames processed by the camera module 121 may be stored in the memory 160 or transmitted to the exterior via the wireless communication unit 110. Two or more camera modules 121 may be provided according to the configuration of the mobile terminal.

The microphone module 122 may receive an external audio signal via a microphone in a particular mode, such as a phone call mode, a recording mode, a voice recognition mode, and the like. This audio signal is processed and converted into digital data. The processed digital data is converted for output into a format transmittable to a mobile communication base station via the mobile communication module 112 in case of the phone call mode. The microphone module 122 may include assorted noise removing algorithms to remove noise generated in the course of receiving the external audio signal.

The manipulating unit 130 may generate input data inputted by a user to control the operation of the mobile terminal. The manipulating unit 130 may include a keypad, a dome switch, a touchpad (e.g., static pressure/capacitance), a jog wheel, a jog switch and the like. A specific example can be a touch screen which the touchpad is layered with the display 151 to be explained later so as to be in cooperation with the display 151.

The sensing unit 140 provides status measurements of various aspects of the mobile terminal. For instance, the sensing unit 140 may detect an open/close status of the mobile terminal, a change in a location of the mobile terminal 100, a presence or absence of user contact with the mobile terminal, and the like, so as to generate a sensing signal for controlling the operation of the mobile terminal 100. For example, regarding a slide-type mobile terminal, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device.

The interface unit 170 is generally implemented to couple the mobile terminal to external devices. Typical external devices may include, for example, wired/wireless headsets, external chargers, wired/wireless data ports, card sockets (e.g., for coupling to a memory card, a Subscriber Identity Module/User Identity Module (SIM/UIM) card, etc.), audio Input/Output (I/O) ports, video I/O ports, earphones, microphones, and the like. The interface unit 170 may receive data from an external device or provided with power and accordingly transfer the received data or power to each component within the mobile terminal 100 or transfer data of the mobile terminal 100 to an external device.

The output unit 150 is configured to output an audio signal, a video signal or an alarm signal. The output unit 150 may include a display 151, an audio output module 152, an alarm output module 153, and the like.

The display 151 may output information processed in the mobile terminal 100. For example, when the mobile terminal is in a phone call mode, the display 151 may provide a User Interface (UI) or a Graphic User Interface (GUI) which includes information associated with the call. As another example, if the mobile terminal is in a video call mode or a capturing mode, the display 151 may additionally or alternatively display images captured and/or received, UI, or GUI. In addition, the display 151 may output a channel list, a language list, as well as various broadcast contents provided by a broadcast service.

Meanwhile, a touch screen can be configured as the display 151 and the touchpad are layered with each other to work in cooperation with each other. This configuration permits the display 151 to function both as an input device and an output device. The display 151 may be implemented using, for example, a Liquid Crystal Display (LCD), a Thin Film Transistor-LCD (TFT-LCD), an Organic Light-Emitting Diode (OLED), a flexible display, a three-dimensional (3D) display or the like. The mobile terminal 100 may include two or more of such displays according to its embodiment. For example, the mobile terminal may simultaneously include an external display (not shown) and an internal display (not shown).

The audio output module 152 may receive audio data which is received from the wireless communication unit 110 in various modes including call-receiving mode, call-placing mode, recording mode, voice recognition mode, broadcast reception mode, and the like, or audio data stored in the memory 160. Also, the audio output module 152 may output audio relating to a particular function (e.g., call received, message received, etc.) performed in the mobile terminal 100. The audio output module 152 may be implemented using a speaker, a buzzer, other audio producing devices and combination thereof.

The alarm output module 153 may output a signal to inform a generation of event associated with the mobile terminal 100. Typical events may include call received, message received, use input received and the like. In addition to generating the audio or video signal, the alarm output module 153 may also inform the event generation in different manners, for example, by providing tactile sensations (e.g., vibration) to a user. The alarm output module 153 may also be configured to vibrate responsive to the mobile terminal receiving a call or message. As another example, vibration is provided by the alarm output module 153 responsive to receiving user input at the mobile terminal, thus providing a tactile feedback mechanism. Such vibration can also be provided to make a user recognize the event generation. The signal informing the event generation may be outputted via the display 151 or the audio output module 152.

The memory 160 is used to store a program for the processing and control of the controller 180, various broadcast contents, a channel list, a language list, and the like, and also temporarily store input/output data (e.g., phonebook data, messages, still images, video, etc.). The memory 160 may be implemented using any type of suitable storage medium including a flash memory, a hard disc, a multimedia card micro type, a card-type memory (e.g., SD or DX memory), Random Access Memory (RAM), Read-Only Memory (ROM), and the like. Also, the mobile terminal 100 may operate a web storage which performs the storage function of the memory 160 on an internet.

The controller 180 typically controls the overall operations of the mobile terminal. For example, the controller 180 performs the control and processing associated with voice calls, data communications, video calls, and the like. The controller 180 may include a multimedia playback module 181 which provides multimedia playback. The multimedia playback module 181 may be configured as part of the controller 180 or as a separate component.

The power supply 190 provides power required by various components under the control of the controller 180. The provided power may be internal power, external power, or combination thereof.

As mentioned above, the internal components of the mobile terminal related to the present invention have been described from the perspective of their functions. Hereinafter, external components of the mobile terminal related to the present invention will be described from the perspective of their functions with reference to FIGS. 11 and 12. The mobile terminal may be implemented in a variety of different configurations, including folder-type, slide-type, bar-type, rotational-type, swing-type or the like. For the sake of brief explanation, further disclosure will primarily relate to a slide-type mobile terminal. However, the present invention may not be limited to the slide-type mobile terminal, but can be applied to other types of terminals.

Figure 11:
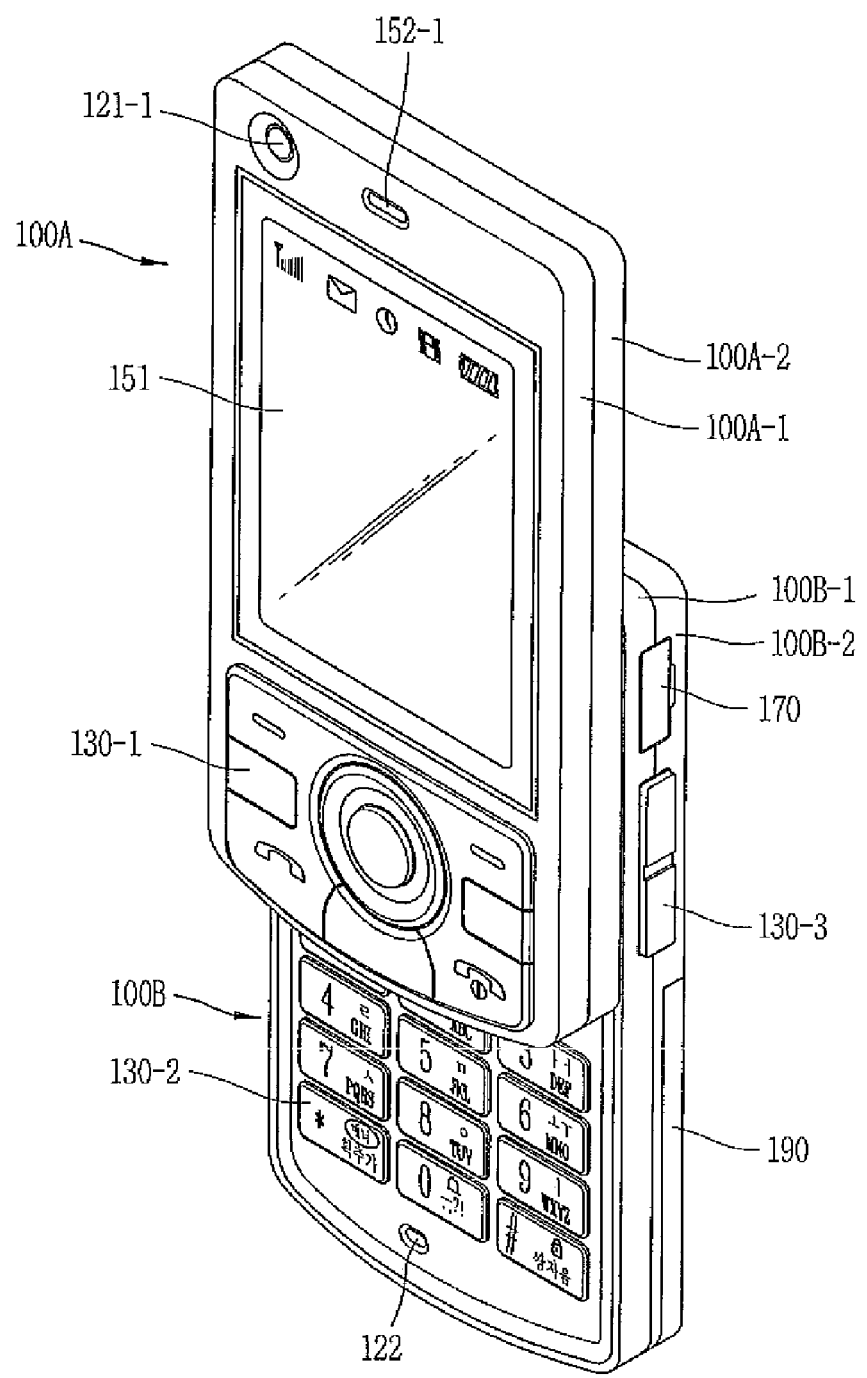
FIG. 11 is a front view of the mobile terminal shown in FIG. 10.

FIG. 11 is a front view of the mobile terminal shown in FIG. 10.

The mobile terminal of the present invention may comprise a first body 100A, and a second body 100B configured to slidably cooperate with the first body 100A in at least one direction.

In a closed position, the first body 100A is positioned over the second body 100B in a manner that the second body 100B is obscured by the first body 100A. As illustrated in FIG. 11, in an open position, the first body 100A exposes at least part of the second body 100B.

The mobile terminal may usually function in a standby mode when in the closed position, but this mode can be released by the user's manipulation. Also, the mobile terminal may typically function in an active (phone call) mode. Here, this mode configuration may be changed according to the user's manipulation or after a certain time elapsed.

A case (housing, casing, cover, etc.) forming the outside of the first body 100A is formed by a first front case 100A-1 and a first rear case 100A-2. Various electronic components may be disposed in a space formed between the first front case 100A-1 and the first rear case 100A-2. One or more intermediate cases may be additionally disposed between the first front case 100A-1 and the first rear case 100A-2.

The cases can be formed of resin in a manner of injection molding, or formed using metallic materials such as stainless steel (STS) and titanium (Ti).

A display 151, a first audio output module 152-1, a first camera module 121-1 or a first manipulating unit 130-1 may be disposed at the first front case 100A-1 of the first body 100A.

The display 151 may include LCD, OLED, and the like, which can visibly display information.

The display 151 and a touchpad can be layered with each other such that the display 151 can be configured to function as a touch screen so as to allow a user to input information.

The first audio output module 152-1 may be implemented as a receiver or a speaker.

The first camera module 121-1 may be implemented to be suitable for a user to capture still images or video.

Like the first body 100A, a case configuring the outside of the second body 100B may be formed by a second front case 100B-1 and a second rear case 100B-2.

The second manipulating unit 130-2 may be disposed at the second body 100B, in detail, at a front face of the second front case 100B-1.

A third manipulating unit 130-3, a microphone module 122 and an interface unit 170 may be disposed at either the second front case 100B-1 or the second rear case 100B-2.

The first to third manipulating units 130-1, 130-2 and 130-3 may be named as a manipulating portion 130. Any tactile manner that a user can touch, e.g., the display 151, for manipulation can be employed for the manipulating portion 130. The manipulating portion 130 can be implemented as a dome switch or touchpad which a user can input information in a pushing or touching manner, or implemented in a manner of using a wheel, a jog or a joystick to rotate keys.

Regarding each function, the first manipulating unit 130-1 is used for inputting commands such as start, end, scroll or the like, and the second manipulating unit 130-2 is used for inputting numbers, characters, symbols, or the like.

The third manipulating unit 130-3 can be operated as a hot key for activating a specific function (e.g., a volume key, etc.) within the mobile terminal. The third manipulating unit 130-3 may operate as a hot-key for displaying a volume level control bar on a screen or displaying a language list on a portion of the screen.

The microphone module 122 may be implemented to be suitable for receiving user's voice or various sounds.

The interface unit 170 may be used as a passage through which the terminal can exchange data or the like with an external device. For example, the interface unit 170 may be implemented as one of a wired/wireless connection port for connecting an earphone to the mobile terminal, a port for short-range communications (e.g., an Infrared Data Association (IrDA) port, a Bluetooth port, a wireless LAN port, etc.), power supply polls for providing power to the external device, or the like.

The interface unit 170 can be a card socket for receiving an external card, such as a Subscriber Identity Module (SIM), a User Identity Module (UIM), a memory card for storing information, or the like. The interface unit 170 has been described in detail. Thus, detailed description thereof will be omitted.

A power supply 190 may be disposed at a side of the second rear case 100B-2 to provide power to the mobile terminal.

The power supply 190 may be a rechargeable battery, for example, to be attachable/detachable for charging.

Figure 12:
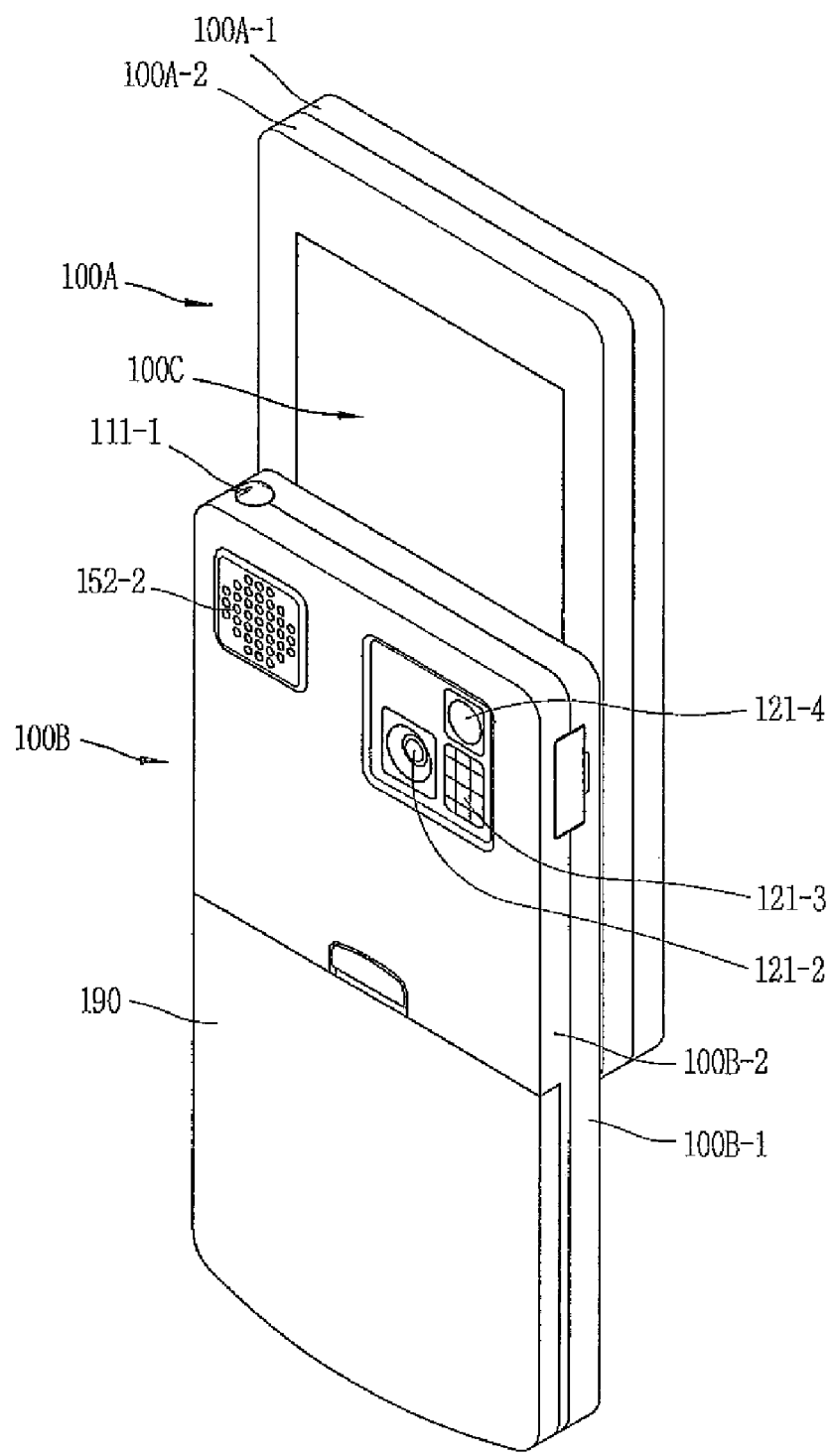
FIG. 12 is a rear view of the mobile terminal shown in FIG. 10.

FIG. 12 is a rear view of the mobile terminal shown in FIG. 10.

As illustrated in FIG. 12, a second camera module 121-2 may additionally be disposed at a rear face of the second rear case 100B-2. The second camera module 121-1 faces a direction which is opposite to a direction faced by the first camera module 121-1 (See FIG. 11), and may have different pixels from those of the first camera module 121-1.

For example, the first camera module 121-1 may operate with a relatively lower resolution than the second camera module 121-2. Thus, the first camera module 121-1 may be useful when a user can capture his face and send it to another party during a video call or the like, while the second camera module 121-2 may be useful for a user to obtain higher quality pictures for later use.

A flash 121-3 and a mirror 121-4 may additionally be disposed adjacent to the second camera module 121-2. The flash 121-3 operates in conjunction with the second camera module 121-2 when taking a picture using the second camera module 121-2. The mirror 121-4 can cooperate with the second camera module 121-2 to allow a user to photograph himself in a self-portrait mode.

The second rear case 100B-2 may further include a second audio output module 152-2.

The second audio output module 152-2 can cooperate with the first audio output module 152-1 (FIG. 11) to provide stereo output. Also, the second audio output module 152-2 may be configured to operate as a speakerphone.

A broadcast signal receiving antenna 111-1 may be disposed at one side of the second rear case 100B-2, in addition to an antenna for communications. The antenna 111-1 can be configured to retract into the second body 100B. One part of a slide module 100C which allows the first body 100A to be slidably coupled to the second body 100B may be disposed at the first rear case 100A-2 of the first body 100A.

The other part of the slide module 100C may be disposed at the second front case 100B-1 of the second body 100B, such that it may not be exposed to the exterior as illustrated in the drawing of the present invention.

As such, it has been described that the second camera module 121-2 is disposed at the second body 100B; however, the present invention may not be limited to the configuration.

For example, it is also possible that one or more of those components (e.g., 111-1, 121-2, 121-3, 152-2, etc.), which have been described to be implemented on the second rear case 100B-2, such as the second camera module 121-2, will be implemented on the first body 100a, particularly on the first rear case 100A-2. In this configuration, the component(s) disposed on the first rear case 100A-2 can be protected by the second body 100B in a closed position of the mobile terminal. In addition, without the second camera module 121-2, the first camera module 121-1 can be implemented to be rotatable so as to rotate up to a direction which the second camera module 121-2 faces.

For a software implementation, the embodiments described herein may be implemented with separate software modules, such as procedures and functions, each of which perform one or more of the functions and operations described herein. The software codes can be implemented with a software application written in any suitable programming language and may be stored in memory, and executed by a controller or processor.

The present invention has been explained with reference to the embodiments which are merely exemplary. It will be apparent to those skilled in the art that various modifications and equivalent other embodiments can be made in the present invention without departing from the spirit or scope of the invention. Thus, it is intended that the present invention cover modifications and variations of this invention provided they come within the scope of the appended claims and their equivalents.

As described above, the present invention includes a method by which a user can flexibly set a broadcast language of his desired channel during or before broadcasting outputted, and improved a user interface environment to facilitate the setup or change of the broadcast language.

In addition, when a mobile terminal goes into a specific region, such as a region using a foreign language or the like, the mobile terminal can be set to automatically display an indication message (e.g., displaying a language), so as to improve quality of a broadcast service.

What is claimed is:

1. A mobile terminal configured to support multi-language operations, comprising:

a wireless receiver adapted to wirelessly receive broadcast data via a plurality of broadcast channels and to wirelessly exchange at least voice data with another mobile terminal;

a display unit; and a controller operatively connected to the wireless receiver and the display unit, the controller adapted to display a list of the plurality of broadcast channels and an icon in the list, the icon corresponding to each of the plurality of broadcast channels that supports multi-language operations, select one of the plurality of broadcast channels that supports multi-language operations in response to a user channel selection, display a language list of the selected channel, set a language of the one of the plurality of broadcast channels to a first language of the language list according to a user language setting command, display the selected channel while outputting audio in the first language and while simultaneously displaying a status bar indicating a status of the mobile terminal, the status bar including a language icon indicating the first language, change the language of the one of the plurality of broadcast channels to a second language of the language list according to a user language change command, and display the selected channel while outputting audio in the second language and while simultaneously displaying the status bar, the language icon indicating the second language.

2. The terminal of claim 1, wherein the additional information comprises an Electric Services Guide (ESG).

3. A method for supporting multi-language of a mobile terminal, comprising:

wirelessly exchanging at least voice data with another mobile terminal by the mobile terminal;

wirelessly receiving, by the mobile terminal, broadcast data via a plurality of broadcast channels;

displaying, by the mobile terminal, a list of the plurality of broadcast channels and an icon in the list, the icon corresponding to each of the plurality of broadcast channels that supports multi-language operations;

selecting, by the mobile terminal, one of the plurality of broadcast channels in response to a user channel selection that supports multi-language operations;

displaying, by the mobile terminal, a language list of the selected channel;

setting, by the mobile terminal, a language of the one of the plurality of broadcast channels to a first language of the language list according to a user language setting command;

displaying the selected channel while outputting audio in the first language and while simultaneously displaying a status bar indicating a status of the mobile terminal, the status bar including a language icon indicating the first language;

changing, by the mobile terminal, the language of the one of the plurality of broadcast channels to a second language of the language list according to a user language change command; and displaying the selected channel while outputting audio in the second language and while simultaneously displaying the status bar, the language icon indicating the second language.

4. The method of claim 3, wherein the additional information comprises an Electric Services Guide (ESG).

5. A mobile terminal configured to support multi-language operations, comprising:

a wireless communication unit configured to exchange at least voice data with another mobile terminal;

a display unit having a screen; and a controller operatively connected to the wireless communication unit and the display unit, the controller adapted to display a list of the plurality of broadcast channels and an icon in the list, the icon corresponding to each of the plurality of broadcast channels that supports multi-language operations, display broadcast contents of a specific broadcast channel, display a language list of the specific broadcast channel on a portion of the screen of the mobile terminal when a user manipulates a volume control key of the mobile terminal, change a previously set broadcast language of the specific broadcast channel to a second language listed in the language list in response to a user language change command, and display the broadcast contents of the specific broadcast channel while outputting audio in the second language and while simultaneously displaying a status bar indicating a status of the mobile terminal, the status bar including a language icon indicating the second language.

6. The terminal of claim 5, wherein the controller is configured to display the language list at one side of the display unit.

7. The terminal of claim 5, wherein the controller is further configured to display a corresponding language list setup menu and to receive an input for setting the broadcast language.

8. The terminal of claim 5, wherein the controller is configured to determine a language which the specific broadcast channel can support based on Electric Services Guide (ESG) information.

9. A method for supporting multi-language of a mobile terminal, comprising:

wirelessly exchanging at least voice data with another mobile terminal by the mobile terminal;

displaying, by the mobile terminal, a list of the plurality of broadcast channels and an icon in the list, the icon corresponding to each of the plurality of broadcast channels that supports multi-language operations, displaying, by the mobile terminal, broadcast contents of a specific broadcast channel;

displaying, by the mobile terminal, a language list of the specific broadcast channel on a portion of a screen of the mobile terminal when a user manipulates a volume control key of the mobile terminal;

changing, by the mobile terminal, a previously set broadcast language of the specific broadcast channel to a second language listed in the language list in response to a user language change command; and displaying the broadcast contents of the specific broadcast channel while outputting audio in the second language and while simultaneously displaying a status bar indicating a status of the mobile terminal, the status bar including a language icon indicating the second language.

10. The method of claim 9, wherein the step of displaying the language list comprises:

displaying a language list control menu; and receiving a user language set command to set the broadcast language.

11. A mobile terminal for supporting multi-language, comprising:
   a wireless receiver adapted to wirelessly receive broadcast data and information identifying an initial language list of the broadcast data and to wirelessly exchange at least voice data with another mobile terminal;
   a display unit; and
   a controller operatively connected to the wireless receiver and the display unit, the controller adapted to automatically update the additional information, automatically determine, based on the updated additional information, whether a separate language not included in the initial language list is supported in the specific geographic region, automatically add an additional language of the specific geographic region to the initial language list, based on the additional information of the broadcast data corresponding to when the mobile terminal moves to the specific geographic region; and
   an output unit adapted to output a message indicating that the additional language is available.

12. The terminal of claim 11, wherein, when the mobile terminal goes into the specific geographic region the controller is configured to
   automatically detect that the mobile terminal has moved into the specific geographic region; and
   automatically add the separate language to the language list as the additional language.

13. The terminal of claim 11, wherein the controller is configured to change a broadcast language of a channel into the additional language in response to a user action.

14. The terminal of claim 11, wherein, when the user inputs a particular key, the controller is configured to
   display a menu for setting a broadcast environment and one of the initial language list and an updated language list;
   select a language from the one of the initial language list and the updated language list; and
   change a broadcast language of a channel in response to a corresponding selection.

15. The terminal of claim 11, wherein the additional information comprises an Electric Services Guide (ESG).

16. A method for supporting multi-language of a mobile terminal, comprising:
   wirelessly exchanging at least voice data with another mobile terminal by the mobile terminal;
   wirelessly receiving, by the mobile terminal, broadcast data and information identifying an initial language list of the broadcast data;
   automatically updating additional information upon detecting that the mobile terminal has moved to a specific geographic region;
   automatically determining whether the specific geographic region supports a language not included in the initial language list;
   automatically adding, by the mobile terminal, a language of the specific geographic region to the initial language list, based on the additional information related to the broadcast data corresponding to when the mobile terminal moves to the specific geographic region; and
   outputting, by the mobile terminal, a message indicating that the additional language is available.

17. The method of claim 16, wherein the step of automatically adding the language to the language list comprises:
   automatically detecting that the mobile terminal has moved into the specific geographic region; and
   if the language not included in the initial language list is supported in the specific geographic region, automatically adding the language to the language list as the additional language.

18. The method of claim 16, further comprising, when a user manipulates a predetermined key:
   displaying a menu for setting a broadcast environment and one of the initial language list and an updated language list;
   selecting a language from the one of the initial language list and an updated language list; and
   changing a broadcast language of a channel in response to the step of selecting.

19. The method of claim 16, wherein the additional information comprises an Electric Services Guide (ESG).

* * * * *